Oct. 7, 1969  R. F. WEST  3,470,833
GRATES FOR FURNACES
Filed Oct. 23, 1967

United States Patent Office 3,470,833
Patented Oct. 7, 1969

3,470,833
GRATES FOR FURNACES
Richard Frank West, London, England, assignor to The Incinerator Company Limited, London, England
Filed Oct. 23, 1967, Ser. No. 677,238
Claims priority, application Great Britain, Oct. 28, 1966, 48,361/66
Int. Cl. F23g 25/00; F24h 1/00
U.S. Cl. 110—18                                    4 Claims

ABSTRACT OF THE DISCLOSURE

A grate for use in incinerators or furnaces which has hollow bars for receiving material to be burnt in a combustion chamber located above the bars. The bars are heated internally to effect drying of the material prior to the combustion process proper and the heating of the bars is an entirely separate process to the actual combustion of material.

The present invention relates to grates for use in incinerators or furnaces.

Dense waste material containing large amounts of moisture always presents a difficulty when such material is to be burnt in large incinerators. The moisture-laden waste material considerably slows down the combustion process by forming a compact mass preventing adequate air flow. This mass of moist material can eventually clog the incinerator and prevent satisfactory reduction of the waste to a fine ash as is desirable.

An object of the invention is to provide a grate which is particularly designed to facilitate drying of wet waste material and thereby speed up the combustion thereof.

According to the present invention there is provided a grate comprising:
 (a) A plurality of bars,
 (b) A surface on which material is received for combustion, said surface being at least partly formed by said bars, and
 (c) Auxiliary heating means for heating the bars internally and thereby drying said material prior to combustion.

The bars may be hollow and heated by means of hot gases passing therethrough.

The heating of the bars is carried out as an entirely separate process from the actual combustion of material.

The bars are preferably arranged so that they extend parallel to one another.

Rods may be incorporated in the grate; the rods may be separate and arranged below the bars with each rod extending perpendicularly of the bars, or the rods may be fabricated into a mesh or grid-like structure.

Figure 1:
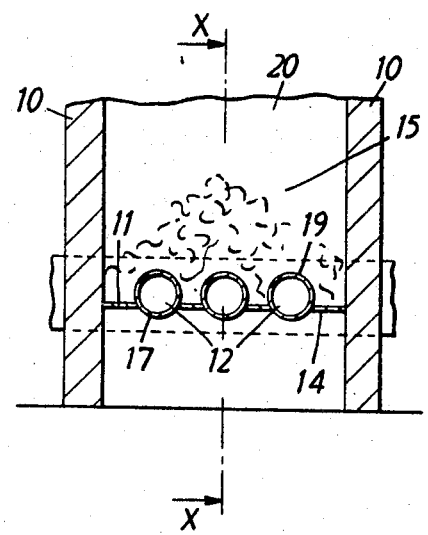
Figure 2:
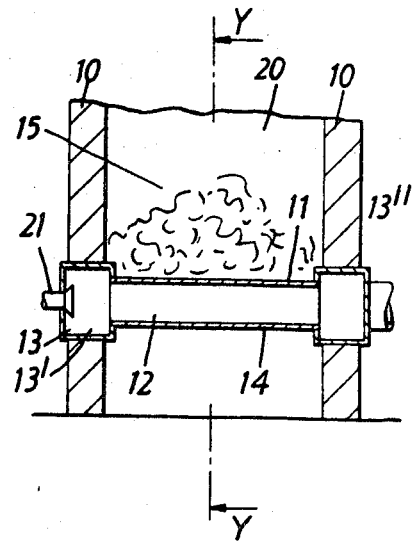

A constructional embodiment of the present invention will now be described, by way of example, with reference to the accompanying drawing, wherein:

FIGURE 1 is a sectional end elevation of a grate made in accordance with the invention; the section being taken along line Y—Y of FIGURE 2; and FIGURE 2 is a sectional front elevation of the grate according to FIGURE 1, the section being taken along line X—X of FIGURE 1.

As shown in the drawing a furnace or incinerator has walls 10 which define a combustion chamber designated 20. In general, the combustion chamber 20 consists of an upper zone or area in which waste material is burnt, a lower zone or area in which the residue of combustion is collected and such an ancillary zone or area as may be required to collect the gases reduced by combustion and lead these gases to a chimney. In this embodiment a grate has a surface 11 which constitutes the lower zone mentioned above. The surface 11 is adapted to receive waste material or refuse generally designated 15 and intended for combustion. The surface 11 of the grate is formed from a combination of elements, namely a series of hollow cylindrical bars 12 having longitudinal axes extending parallel to one another which contact or lie closely adjacent a plurality of solid rods 14 located below the bars 12. The rods 14 may be separate rods each extending perpendicularly of the bars 12 or, preferably the rods 14 are fabricated into a grid structure with rods 14 extending parallel to the bars 12 intermeshing with rods 14 extending perpendicularly of the bars 12. The rods 14 extending perpendicularly to the bars 12 are formed with shaped portions 17 which receive and locate the bars 12. The bars 12 and rods 14 combine to form the surface 11 which carries the waste material 15. The ends of each of the bars 12 are secured in the walls 10 by means of headers 13. As shown particularly in FIGURE 1, the waste material 15 is deposited so as to lie on and around the bars 12. Thus, waste material 15 extends around part of the peripheral surface of each of the bars 12 and contacts part of the peripheral surface of each of the rods 14 extending perpendicularly of the bars 12. The part 19 of the peripheral surface of each of the bars 12 which actually contacts the waste material 15 represents a major proportion of the total peripheral surface of the bar. To assist the evaporation of moisture contained in the material 15 and thereby effect drying of the material 15 prior to combustion the bars 12 are heated as will be explained hereinafter. Generally, some auxiliary heating means is provided to heat the bars 12 as a separate process from the actual combustion in chamber 20. In the particular example shown gases pass through the bars 12 to effect the heating thereof. As shown in FIGURE 2 by an arrow A, gases enter the bars 12 via headers 13' and leave the bars 12 via headers 13" in an opposite wall 10 to that of headers 13'.

The gases leaving the headers 13" can be returned to the upper part of the chamber 20 to assist the combustion process. Alternatively these gases can be passed to some other convenient part of the furnace if so desired or taken to some area remote therefrom. In order to heat the gases passing through the bars 12 any suitable method can be employed, for example, electrical heating elements or burners. Alternatively the bars 12 can be heated by passing waste gases arising from the main combustion process therethrough. As shown in FIGURE 2 this particular embodiment is provided with burners 21 designed to burn gas or fuel oil and thereby heat the gases passing through the bars 12. The bars 12 are shown to be cylindrical but any type of hollow bar, such as, oval or rectangular, can be used according to the size of the grate and its application. Accordingly the bars 12 may have a small cross-section in the order of 1½" to 2" or a larger cross-section in the order of 12" to 24".

The rods 14, as stated hereinbefore, can be separate or formed into a grid, and they can each be flat or round in cross-section as desired.

The bars 12 and/or rods can be constructed from cast iron, stainless steel or any suitable refractory material.

I claim:
1. A grate comprising:
 (a) a plurality of hollow bars,
 (b) a surface on which material is received for combustion, said surface being at least partly formed by a portion of the periphery of each of the bars which constitutes more than half the total periphery thereof, and
 (c) auxiliary heating means for heating the bars in- ternally and thereby drying said material prior to combustion, said auxiliary heating means comprising means for passing a gas through the bars, and means for heating said gas.

2. A grate according to claim 1, wherein the bars are arranged with their longitudinal axes parallel and lie above a plurality of rods which provide part of said surface.

3. A grate according to claim 2, wherein the rods are fabricated into a grid structure with some rods extending parallel to the bars and some rods extending perpendicularly of the bars, the rods which extend perpendicularly of the bars being bent into a shape so as to receive and locate the bars.

4. A grate according to claim 1, wherein the means for heating said gas consists of burners consuming a combustible medium.

References Cited

UNITED STATES PATENTS

| | | | |
|---|---|---|---|
| 1,349,853 | 8/1920 | Peden | 126—343.5 |
| 2,693,774 | 11/1954 | Knowles. | |
| 3,357,376 | 12/1967 | Miller. | |
| 3,373,734 | 3/1968 | Roemer | 126—343.5 |

JOHN J. CAMBY, Primary Examiner

U.S. Cl. X.R.

126—343.5